United States Patent [19]

Champlin

[11] Patent Number: 5,343,380
[45] Date of Patent: Aug. 30, 1994

[54] METHOD AND APPARATUS FOR SUPPRESSING TIME-VARYING SIGNALS IN BATTERIES UNDERGOING CHARGING OR DISCHARGING

[76] Inventor: Keith S. Champlin, 5437 Elliot Ave. South, Minneapolis, Minn. 55417

[21] Appl. No.: 977,560

[22] Filed: Nov. 17, 1992

[51] Int. Cl.$^5$ .............................................. H02J 7/10
[52] U.S. Cl. ...................................... 363/46; 320/14; 320/21
[58] Field of Search .............. 322/58; 363/46; 320/14, 320/21

[56] References Cited

U.S. PATENT DOCUMENTS

| | | | |
|---|---|---|---|
| 4,697,134 | 9/1987 | Burkum et al. | 320/48 |
| 4,710,861 | 12/1987 | Kanner | 363/46 |
| 5,140,269 | 8/1992 | Champlin | 324/433 |

OTHER PUBLICATIONS

The Institute of Electrical and Electronics Engineers, Inc.; IEEE Recommended Practice for Maintenance, Testing, and Replacement of Large Lead Storage Batteries for Generating Stations and Substations; Mar. 9, 1987; pp. 7–15.
IEEE; Sheldon DeBardelaben; Determining The End of Battery Life; 1986; pp. 365–368.
IEEE; Feder et al.; Field And Laboratory Studies To Assess The State of Health Of Valve–Regulated Lead Acid Batteries: Part I—Conductance/Capacity Correlation Studies; 1992; pp. 218–233.
IEEE Vaccaro et al.; Internal Resistance: Hardbinger of Capacity Loss in Starved Electrolyte Sealed Lead Acid Batteries; 1987; pp. 128–131.

*Primary Examiner*—R. J. Hickey

[57] ABSTRACT

An electronic device for effectively preventing time-varying current from passing through an electro-chemical cell or battery is disclosed. Time-varying current flowing in a circuit which includes the cell/battery is sensed externally to the cell/battery with a magnetically-coupled ac current probe thereby producing an induced time-varying signal. This induced signal is amplified to the level of the original time-varying current and applied to the cell/battery's terminals in phase-opposition to the original current. As a result, the component of time-varying current flowing in the cell/battery's external leads assumes an alternate path around the cell/battery and is effectively canceled within the cell/battery itself. Time-varying voltage across the cell/battery, which would normally result from time-varying current passing through its internal impedance, is likewise eliminated. Accordingly, measurements of the cell/battery's incremental parameters can be performed with the cell/battery "on line" without measurement errors due to spurious charger- and load-related signals. Additional applications of the disclosed device include reducing or eliminating ripple and crosstalk in batteries that are supplying voltage-sensitive equipment, and preventing plate deterioration caused by ac currents flowing through a cell/battery.

8 Claims, 9 Drawing Sheets

METHOD AND APPARATUS FOR SUPPRESSING TIME-VARYING SIGNALS IN BATTERIES UNDERGOING CHARGING OR DISCHARGING

BACKGROUND OF THE INVENTION

This invention relates generally to method and apparatus for reducing or eliminating time-varying currents and voltages which may be present in an electrochemical cell or battery while it is in the process of being charged or is supplying power to an active load. More particularly, it relates to the problem of using a time-varying signal to measure a cell/battery's incremental parameters—such as its incremental conductance, resistance, or impedance—while the cell/battery is "on line" and therefore already conducting a time-varying current. By employing the present invention, such incremental parameters can be accurately measured during periods of normal use—without requiring that the cell/battery be removed from service. This invention therefore significantly increases the utility of dynamic conductance battery testing apparatus of the type disclosed previously in U.S. Pat. No. 5,140,269 issued to Keith S. Champlin. Additional applications of the present invention include eliminating ripple and crosstalk in batteries that are supplying voltage-sensitive equipment and preventing plate deterioration caused by ac currents flowing through a cell/battery.

Stationary lead-acid batteries are employed in many applications requiring energy to be delivered continuously over relatively long periods of time. Such batteries, comprised of banks of series-connected two-volt cells, are found at electric generating plants, substations, telephone central offices, railroad signal sites, airport control towers, and countless other critical installations to provide secondary emergency power for use in the event of failure of a primary energy source. Applications requiring relatively long-term reliance on such secondary batteries include emergency lighting for hospitals and industrial plants, and uninterruptible energy supplies for critical communications equipment and computers. Individual cells of stationary batteries are often separate entities with accessible terminals. Such cells may be physically quite large and will sometimes weigh hundreds of pounds.

The traditional method for testing stationary batteries, or their individual cells, is the timed-discharge test. This well-established procedure is fully described in Section 6 of ANSI/IEEE Standard 450–1987. Under this procedure, one removes the battery from service and discharges it at a constant current while simultaneously monitoring the terminal voltage of the battery and/or its individual cells. The cell/battery capacity is then calculated from the length of time that the discharge can be sustained before the appropriate voltage drops below a particular threshold value.

Although the timed-discharge test has seen widespread use, it possesses serious disadvantages. These include:

1. The test requires that the battery be removed from service for a considerable length of time (usually 8 or 10 hours).
2. Currents drawn may be relatively large and can thus require apparatus that is heavy and cumbersome.
3. After being tested, the battery must be recharged before it can be returned to service. This requires additional time.
4. Only a fixed number of charge-discharge cycles can be provided by a given battery. As a result, each timed-discharge test removes potential service capability.

Because of these disadvantages, measurements of small-signal incremental parameters such as resistance, impedance, and conductance, have been proposed as alternatives to the timed-discharge test. The motivation for this effort dates from the pioneering work of DeBardelaben (S. DeBardelaben, "Determining the End of Battery Life", INTELEC 86, Toronto, Canada, pp. 365–368). His paper disclosed a strong inverse correlation between a cell's capacity and either the magnitude of the cell impedance or its resistive real part. Additional studies by Vaccaro and Casson (F. J. Vaccaro and P. Casson, "Internal Resistance: Harbinger of Capacity Loss in Starved Electrolyte Sealed Lead Acid Batteries" INTELEC 87, Stockholm, Sweden pp 128–131) showed that increased impedance and resistance were also good indicators of "dryout" of sealed-lead acid stationary batteries.

In U.S. Pat. No. 5,140,269 referenced above, the present inventor disclosed apparatus for measuring incremental conductance of a cell/battery and showed that this quantity is related linearly to the capacity of the cell/battery. This assertion has been corroborated by many field measurements such as those described in a recent paper by Feder, et al. (D. O. Feder, et al. "Field and Laboratory Studies to Assess the State of Health of Valve-Regulated Lead Acid Batteries: Part I Conductance/Capacity Correlation Studies", INTELEC 92, Washington, D.C., pp. 218–233). Results of both timed-discharge tests and conductance measurements on approximately 500 cells are presented therein. These results indeed reveal a very linear relationship between battery/cell capacity and incremental conductance and display a high degree of correlation ($R^2$ of 0.80 to 0.98).

In order to measure incremental resistance or impedance, one passes a time-varying current through a cell/battery and observes the appropriate component of the resulting time-varying voltage developed across it. Incremental conductance is measured in the opposite manner. One places a time-varying voltage across a cell/battery and observes the appropriate component of time-varying current passing through the cell/battery. In either type of measurement, a problem arises if there are already time-varying currents and voltages present. Such signals, when present during measurement, can degrade accuracy and may introduce serious error. Unfortunately, spurious time-varying signals are common occurrences for cells/batteries undergoing either "float" or high-rate charging, or supplying power to an "active" load. Under such circumstances, time-varying battery currents frequently result from imperfect filtering of the battery charger's rectifier or from fluctuations in the current drawn by the load.

One approach to solving problems introduced by charger/load-related signals is to simply remove the battery from service during measurement of its incremental parameters. This has, in fact, been done many times with satisfactory results. Many cases arise, however, in which it is not desirable or even feasible to take the cell/battery "off line."

A second approach is described in the prior art and is the approach followed by DeBardelaben in the reference cited above, as well as by Burkum and Gabriel in U.S. Pat. No. 4,697,134. Their approach is to choose the measurement frequency to be different from any frequencies that are otherwise present in the charger/load circuit and to then use filters to separate the measuring signal from the spurious signals. This solution to the problem is likewise not entirely satisfactory since it assumes prior knowledge of the spurious signal frequencies and requires that the measurement frequency be dictated by the characteristics of the charger/load circuit rather than by requirements of the cell/battery itself.

SUMMARY OF THE INVENTION

A totally different approach to the problem posed by charger/load-related signals is disclosed herein. Instead of attempting to remove such signals by filtering, they are removed by an electronic cancellation technique. Time-varying current components in an external circuit are sensed and electronically prevented from passing through the cell/battery. Instead, they are shunted around the battery on an alternate path. Since no time-varying currents pass through the cell/battery, no time-varying voltages develop across the battery's internal impedance. The cell/battery is therefore completely free of spurious signals, and its incremental parameters can be readily measured without charger/load-related errors being introduced.

An electronic device for effectively preventing time-varying current from passing through an electro-chemical cell or battery is disclosed herein. Time-varying current flowing in a circuit which includes the cell/battery is sensed externally to the cell/battery with a magnetically-coupled ac current probe thereby producing an induced time-varying signal. This induced signal is amplified to the level of the original time-varying current and applied to the cell/battery's terminals in phase-opposition to the original current. As a result, the component of time-varying current flowing in the cell/battery's external leads assumes an alternate path around the cell/battery and is effectively canceled within the cell/battery itself. Time-varying voltage across the cell/battery, which would normally result from time-varying current passing through its internal impedance, is likewise eliminated. Accordingly, measurements of the cell/battery's incremental parameters can be performed with the cell/battery "on line" without measurement errors due to spurious charger- and load-related signals. Additional applications of the disclosed device include reducing or eliminating ripple and crosstalk in batteries that are supplying voltage-sensitive equipment, and preventing plate deterioration caused by ac currents flowing through a cell/battery.

DETAILED DESCRIPTION OF THE PREFERRED EMBODIMENTS

Figure 1:
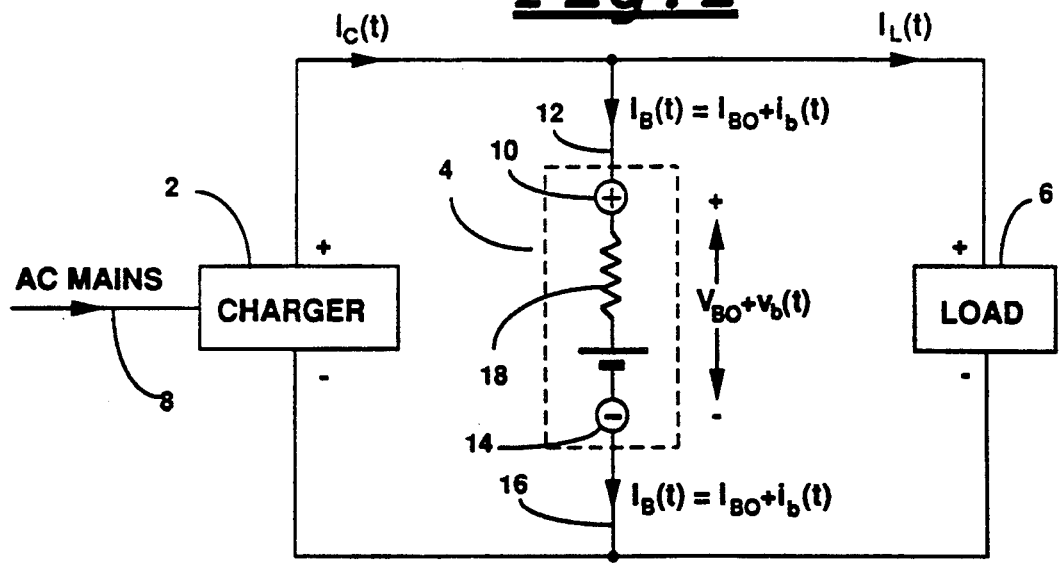
FIG. 1 is a simplified block diagram depicting the interconnection of a battery charger, a battery, and a load in a typical stationary battery system.

Referring first to FIG. 1, a simplified block diagram is disclosed which depicts a battery charger 2, a cell/battery 4, and a load 6, interconnected in a typical stationary battery system. Battery charger 2, which is powered by the ac mains 8, supplies a rectified output current $I_C(t)$ to the cell/battery 4 for charging purposes, as well as supplying current to the load 6. Although $I_C(t)$ is nominally a direct current, it may contain a significant time-varying current component if the rectifier's output is insufficiently filtered. The load 6 accepts load current $I_L(t)$ which may itself contain a significant time-varying component associated with dynamic changes in the load.

The battery current $I_B(t)$ is the difference between the charger current and the load current: $I_B(t) = I_C(t) - I_L(t)$. This current is conducted into the cell/battery s positive terminal 10 by positive lead 12, and away from its negative terminal 14 by negative lead 16, thus passing through cell/battery 4. Since both $I_C(t)$ and $I_L(t)$ may themselves have time-varying components, their difference $I_B(t)$ may likewise contain a significant time-varying current component. The battery current can thus be written $$I_B(t) = I_{BO} + i_b(t) \qquad \text{Eq. 1}$$

where $I_{BO}$ is the dc or time-average value of the current flowing into positive terminal 10, and $i_b(t)$ is an assumed time-varying current component having no dc or average value.

Time-varying current component $i_b(t)$, passing through the cell/battery's internal impedance element 18, produces a time-varying voltage between the cell/battery's terminals 10 and 14. Accordingly, the cell/battery's terminal voltage is of the form $$V_B(t) = V_{BO} + V_b(t) \qquad \text{Eq. 2}$$

where $V_{BO}$ is the dc component of terminal voltage and $v_b(t)$ is a time-varying voltage component having no DC or average value.

Figure 2A:
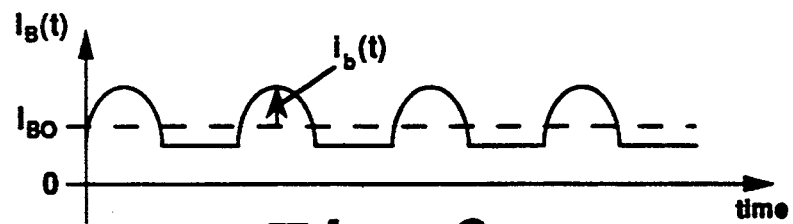
FIGS. 2a, 2b, and 2c are graphical plots depicting waveforms of various components of current passing through the battery depicted in FIG. 1.
Figure 2B:
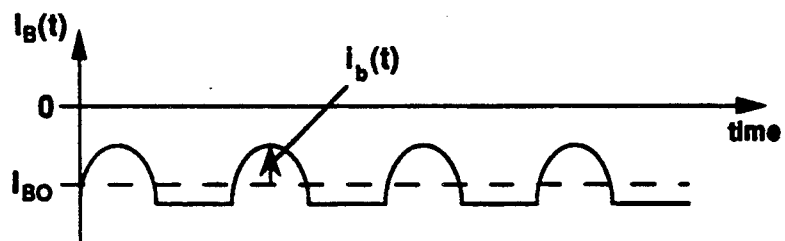
Figure 2C:
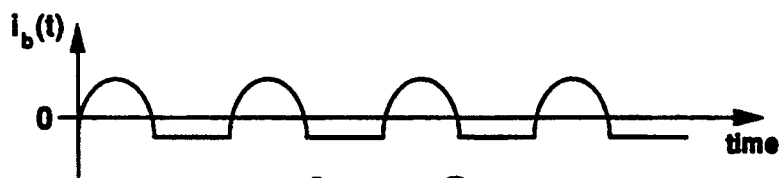

FIGS. 2a–2c depict typical cell/battery current waveforms which might arise in the case of a half-wave rectified battery charger having little or no output filtering. FIG. 2a depicts the $I_B(t)$ waveform under cell-/battery charging conditions. The dc component $I_{BO}$ is observed to be positive, thus indicating that a net average current is flowing into positive terminal 10. The time-varying current component $i_b(t)$ adds to the dc current component $I_{BO}$ causing the total current $I_B(t)$ to rise above and fall below its average or dc level $I_{BO}$. FIG. 2b depicts similar waveforms for the case where $I_{BO}$ is negative, thus indicating that the cell/battery is undergoing a net discharge. FIG. 2c depicts the waveform of the time-varying current component $i_b(t)$ alone under either net charging or net discharging conditions. One sees that time-varying current component $i_b(t)$ takes on both positive and negative values such that its time-average (dc) value is zero.

Figure 3:
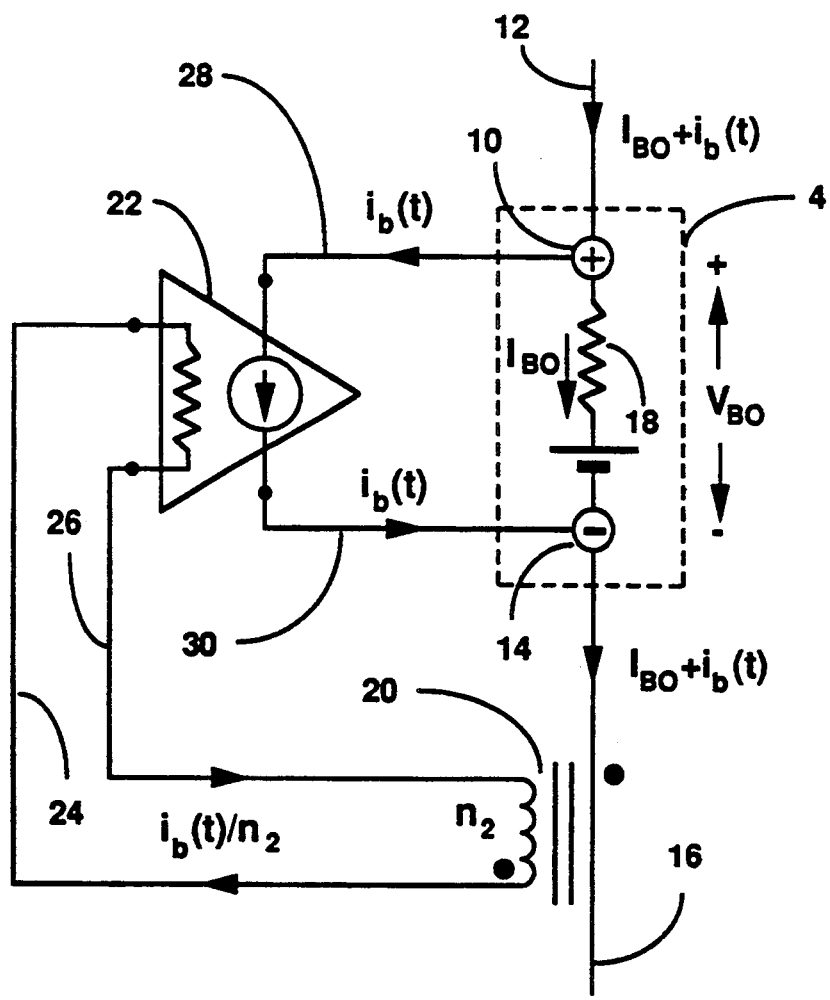
FIG. 3 discloses a simplified block diagram of apparatus for preventing a time-varying component of current from passing through the cell/battery of FIG. 1 in accordance with principles of the present invention.

FIG. 3 discloses a simplified block diagram of apparatus for preventing time-varying current component $i_b(t)$ from passing through cell/battery 4 in accordance with principles of the present invention. Time-varying current component $i_b(t)$, flowing in the cell/battery's external negative lead 16, is sensed with a magnetically-coupled ac current probe 20. Either external lead can be employed for sensing $i_b(t)$, and the use of negative lead 16 rather than positive lead 12 is simply a matter of choice. As will be apparent to those skilled in the art, the dc current component $I_{BO}$ flowing through lead 16 will be totally ignored by magnetically-coupled ac current probe 20, and only $i_b(t)$, the time-varying current component having zero average value, will be sensed.

Ac current probe 20 comprises a current transformer having a single primary turn and $n_2$ secondary turns. Accordingly, its output current is an induced time-varying current signal-that is identical in waveform to $i_b(t)$ but with amplitude reduced by the factor $1/n_2$. This induced current signal $i_b(t)/n_2$ is conducted to the input of a current amplifier 22 via input signal conductors 24 and 26. Current amplifier 22 is a special electronic circuit that is described in detail below. It is so constructed that it prevents dc current from passing through its output terminals but has a current gain of precisely $n_2$ for time-varying input signals. The resulting output signal of current amplifier 22 is therefore a time-varying current that is virtually identical in both amplitude and waveform to $i_b(t)$, the original time-varying component of current passing through external cell/battery leads 12 and 16.

The output current signal $i_b(t)$ of current amplifier 22 is conducted to positive terminal 10 and negative terminal 14 by output signal conductors 28 and 30, respectively. These two output signal conductors are arranged so that their respective signal currents enter and leave terminals 10 and 14 in phase opposition to the original time-varying current component $i_b(t)$ conducted to those terminals by cell/battery leads 12 and 16. As a result, the time-varying current component $i_b(t)$ is canceled within cell/battery 4. Instead, $i_b(t)$ passes around cell/battery 4 via an alternate conduction path comprising output signal conductor 28, the output circuit of current amplifier 22, and output signal conductor 30.

Since time-varying current component $i_b(t)$ is eliminated within cell/battery 4, only the dc current $I_{BO}$ passes through the cell/battery's internal impedance 18 as shown in FIG. 3. Accordingly, only dc voltage $V_{BO}$ appears between terminals 10 and 14 the time-varying voltage component $v_b(t)$ having been completely suppressed. Thus, insofar as charger- and load-related signals are concerned, the circuit disclosed in FIG. 3 places cell/battery 4 in exactly the same condition as if it were taken "off line". However, as far as direct current is concerned, the battery is still in service—accepting dc current from charger 2 and/or supplying dc current to load 6.

Figure 4:
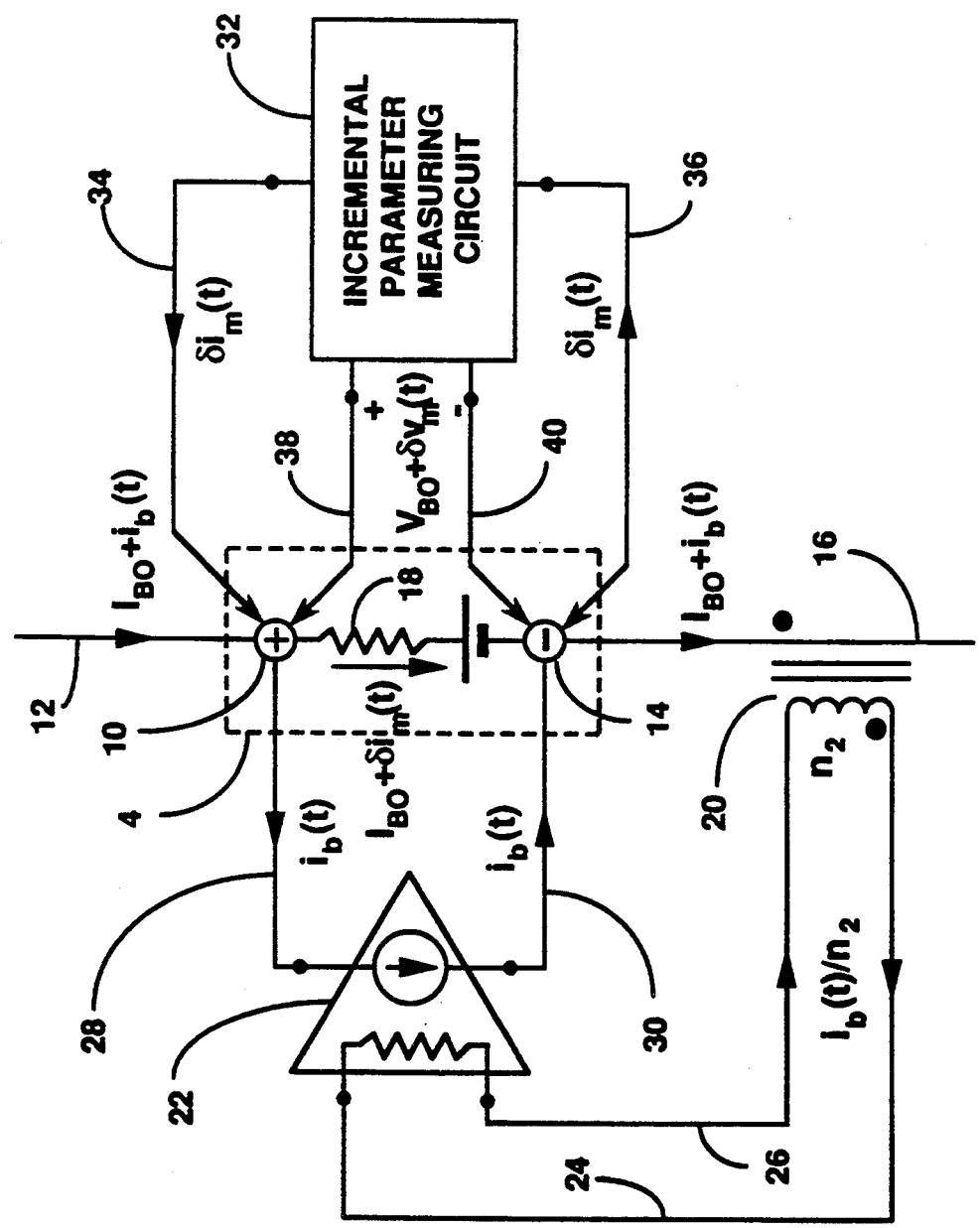
FIG. 4 discloses a simplified block diagram depicting measurement of the battery's incremental parameters while the battery is still "on line" in accordance with the present invention.

FIG. 4 illustrates apparatus of the type disclosed in FIG. 3 arranged to permit measurement of one or more of the cell/battery's six incremental parameters (i.e., impedance, resistance, reactance, admittance, conductance, susceptance) while it is "on line." A generalized incremental parameter measuring circuit 32 connects to positive terminal 10 of cell/battery 4 by means of positive measuring-current conductor 34 and positive measuring voltage conductor 38; and to negative terminal 14 of cell/battery 4 by means of negative measuring-current conductor 36 and negative measuring-voltage conductor 40. As is well known to those skilled in the art, the use of separate measuring voltage and current conductors to contact each of the battery's terminals 10 and 14 permits incremental parameters to be measured without errors caused by resistance of the contacts and lead wires.

An incremental time-varying measuring current $\delta i_m(t)$ leaves measuring circuit 32 via current conductor 34 and enters positive cell/battery terminal 10. Because of the very low impedance of cell/battery 4 in comparison with that of the path through the charger/load circuit, current $\delta i_m(t)$ flows predominantly through cell/battery 4, leaving via negative cell/battery terminal 14, and returning to circuit 32 via conductor 36. Since, in traversing this path, current $\delta i_m(t)$ does not pass through cell/battery lead 16, its presence is not sensed by ac current probe 20. Accordingly, unlike spurious current $i_b(t)$, measuring current $\delta i_m(t)$ is not canceled within cell/battery 4 by the action of current amplifier 22. Instead, $\delta i_m(t)$ is permitted to pass through impedance element 18 thus causing a time-varying voltage component $\delta v_m(t)$ to be developed across it. The sum of this incremental voltage component $\delta v_m(t)$ and the dc battery voltage $V_{BO}$ is sensed by measuring circuit 32 via positive and negative voltage-measuring conductors 38 and 40, respectively.

One sees that the values of incremental voltage $\delta v_m(t)$, and incremental current $\delta i_m(t)$ that interface with measuring circuit 32 on conductors 34, 36, 38, and 40 are identical to those values that would exist if cell/battery 4 was taken "off line" (so that $i_b(t)=0$), and output signal conductors 28 and 30 were disconnected from cell/battery terminals 10 and 14, respectively. Accordingly, by employing the apparatus disclosed in FIG. 4, one can readily measure incremental parameters while the cell/battery is still "on line" in normal service.

Figure 5:
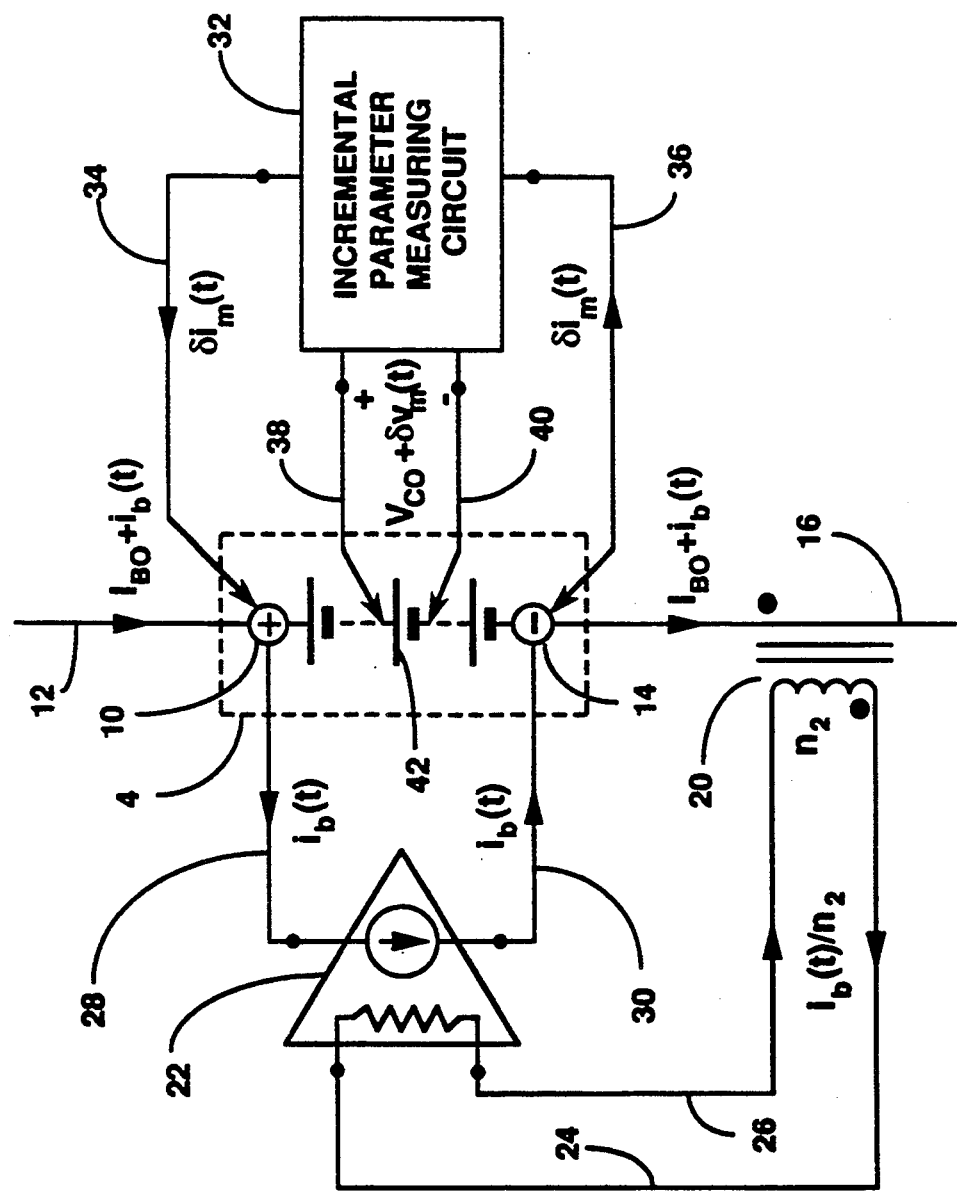
FIG. 5 discloses a block diagram similar to FIG. 4 illustrating measurement of the incremental parameters of a single cell located in a series string of cells comprising a battery while that battery is "on line".

FIG. 5 is a block diagram similar to FIG. 4 illustrating apparatus of the type disclosed in FIG. 3 arranged to permit measurement of incremental parameters of a single cell 42 located in a series-string of cells comprising battery 4. One sees from FIG. 4 that the apparatus is arranged to cancel the spurious current component $i_b(t)$ throughout all of the cells in the string. In addition, the incremental measuring current $\delta i_m(t)$ passes through all the cells in the string. However, only the voltage across single cell 42, $V_{co}+\delta v_m(t)$, is sensed by measuring circuit 32 via voltage conductors 38 and 40. Accordingly, incremental parameters appropriate to single cell 42 alone will be measured by measuring circuit 32.

As should be clear to one skilled in the art, one could construct several alternative arrangements which would accomplish this same objective. For example, one could pass $\delta i_m(t)$ through only cell 42 rather than through the whole string. Similarly, one could cancel $i_b(t)$ in only cell 42 rather than canceling it in the whole string. The first alternative would require arranging measuring current conductors 34 and 36 to contact the positive and negative terminals of cell 42, respectively, rather than battery terminals 10 and 14 as is illustrated in FIG. 5. The second alternative would result from arranging signal conductors 28 and 30 to contact the positive and negative terminals of cell 42, respectively, rather than contacting battery terminals 10 and 14 as is illustrated in FIG. 5.

Figure 6:
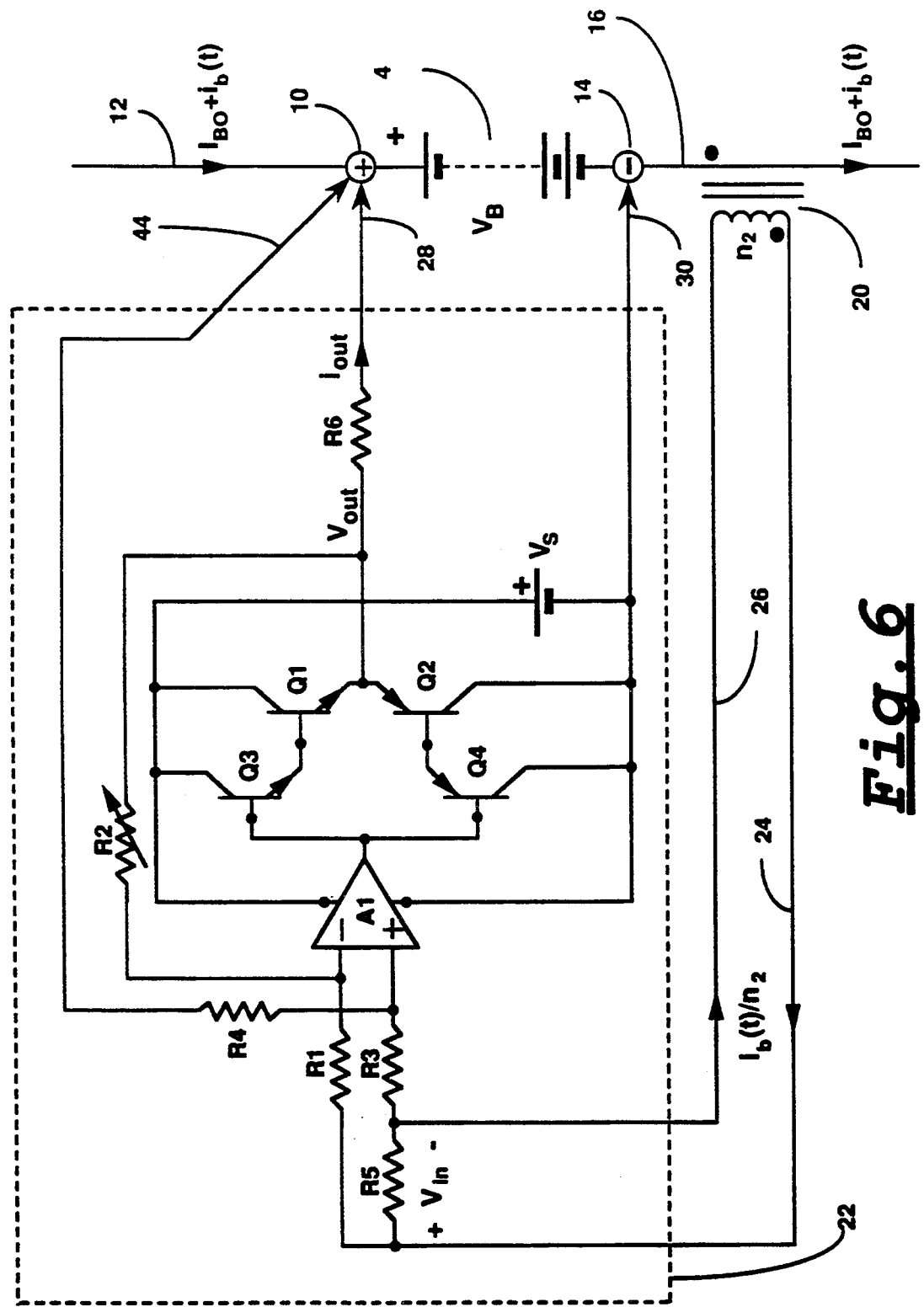
FIG. 6 discloses a schematic diagram of practical apparatus for effectively preventing time-varying currents from passing through a cell or battery in accordance with the present invention.

FIG. 6 is a schematic diagram of practical apparatus for effectively preventing a spurious time-varying current from passing through a cell or battery in accordance with the present invention. One sees from FIG. 6 that current amplifier 22 comprises the interconnection of resistors R1–R6, power transistors Q1–Q4, operational amplifier A1, and dc power supply $V_S$. A noteworthy feature of this circuit is the fact that dc current is prevented from flowing through the output circuit of current amplifier 22 even though no "blocking" capacitor is employed. A "blocking" capacitor would, of necessity, be required to have an impracticably large value due to the extremely low impedance of the cell/battery and to the low frequency of components of $i_b(t)$.

Consider the circuit of FIG. 6. Assume that the dc power supply voltage $V_S$ is larger than the cell/battery voltage $V_B$. Operational amplifier A1 along with power transistors Q1–Q4 forms a two-stage amplifier cascade comprising a high-gain voltage amplifier followed by a transistor power output stage. Transistors Q1 and Q3 comprise a Darlington pair of npn power transistors and transistors Q2 and Q4 comprise a Darlington pair of pnp power transistors. Together, the four transistors comprise a complementary, push-pull, emitter-follower, power amplifier stage having large current gain.

As will be appreciated by those skilled in the art, the two-stage amplifier cascade along with resistors R1–R4 comprises a feedback-type differential amplifier circuit. The input voltage of this amplifier, $V_{in}$, is the differential voltage developed across resistor R5. The output voltage, $V_{out}$, is the voltage at the common node of the emitters of Q1 and Q2, and the left side of resistor R6. Negative feedback is provided by resistor R2 which connects between the output node and the inverting (−) input of operational amplifier A1.

The non-inverting (+) input of operational amplifier A1 is biased to the potential of positive cell/battery terminal 10 by means of voltage sensing conductor 44 and resistor R4. As will be readily understood by those skilled in the art, negative feedback through resistor R2 causes $V_{out}$ to assume the same potential as the non-inverting (+) input of amplifier A1 under zero-signal ($v_{in}=0$) conditions. Since this potential is the same as the potential of positive battery terminal 10, no dc voltage drop will exist across R6 and therefore no dc current will pass through the output circuit of current amplifier 22 when the input signal is reduced to zero.

With a time-varying current component $i_b(t)$ flowing through battery lead 16, an induced current $i_b(t)/n_2$ is conducted through resistor R5 by conductors 24 and 26. Thus, $v_{in}$, the input voltage developed across R5 is given by $$v_{in}(t) = \frac{i_b(t)R5}{n_2} \qquad \text{Eq. 3}$$

As will be readily understood by those skilled in the art, the voltage gain of the two-stage differential amplifier cascade can be written $$\frac{V_{out}}{V_{in}} = -\frac{(R2 + R4)}{(R1 + R3)} \qquad \text{Eq. 4}$$

where $V_{out}$ is defined with respect to the potential of positive cell/battery terminal 10. As is shown in FIG. 6, the output current of current amplifier 22, $i_{out}$ is the current passing from left to right through resistor R6. Its value is given by $$i_{out}(t) = \frac{v_{out}(t)}{R6} \qquad \text{Eq. 5}$$

Combining equations (3), (4), and (5) leads to the following expression for the output current of current amplifier 22

$$i_{out}(t) = -\left\{ \frac{(R2 + R4)R5}{n_2(R1 + R3)R6} \right\} i_b(t) \qquad \text{Eq. 6}$$

As has been disclosed above with reference to FIGS. 3, 4, and 5, complete cancellation of $i_b(t)$, the time-varying current component flowing through cell/battery 4, results from choosing $i_{out}(t) = -i_b(t)$. One sees from FIG. 6 that this occurs for $$\left\{ \frac{(R2 + R4)R5}{n_2(R1 + R3)R6} \right\} = 1 \qquad \text{Eq. 7}$$

In practice, one of the four resistors, R1 through R4, can be chosen to be adjustable so that this condition can be precisely achieved. This adjustable resistor is R2 in the schematic diagram disclosed in FIG. 6.

Consider the power amplifier stage of current amplifier 22. This stage operates in the "class-B" mode which means that the output transistors are biased to cutoff and only conduct current during particular portions of a signal cycle. During the half-cycle for which $i_b(t)$ is negative, $i_{out}(t)$ is positive. Power supply $V_S$ "sources" this positive output current and drives it forward through npn transistor Q1 and resistor R6 into positive battery terminal 10. In order to accomplish this, the power supply voltage $V_S$ must, of course, be larger than $V_B$, the voltage of cell/battery 4. During the half-cycle for which $i_{out}(t)$ is negative, current flows into conductor 28 from positive terminal 10. Cell/battery 4 "sources" this negative current and drives it back through resistor R6 and pnp transistor Q2 to negative terminal 14. Thus, cell/battery 4 alternately serves as a current source and as a current sink during successive half cycles of $i_b(t)$. The dc power supply $V_S$ serves only as a current source, however; and only does so during the alternate half-cycles that cell/battery 4 is acting as a current sink.

It is clear from this discussion that one could eliminate dc power supply $V_S$ along with npn transistors Q1 and Q3 by operating the remaining two pnp transistors in the "class-A" mode; that is, by biasing transistors Q2 and Q4 so that they would conduct continuously. Cell/battery 4 would then serve as a current source continuously. The price one would pay for this obvious modification, however, is that cell/battery 4 would then be required to supply dc current of at least one-half the peak to peak value of $i_b(t)$. In contrast, the "class-B" power amplifier of FIG. 6 draws no dc current from cell/battery 4. A second obvious modification would be to replace the complementary Darlington-connected bipolar transistors with complementary power MOSFETs. All such circuitry modifications are, however, believed to lie within the scope of this invention.

Table I contains a listing of component types and values for the embodiment disclosed in FIG. 6 configured to cancel time-varying currents of up to 16 amperes, peak to peak, flowing through a 6-volt (3 cell) battery.

TABLE I
COMPONENT TYPES AND VALUES FOR CIRCUIT OF FIG. 6

| Reference Number | Component | |
|---|---|---|
| *Semiconductor Devices* | | |
| Q1, Q3 | TIP41A | |
| Q2, Q4 | TIP42A | |
| A1 | LT1013CN | |
| *Resistors-Ohms (1/4-W unless specified)* | | |
| R1 | 1K | |
| R2 | 47K | (100K trimmer pot) |
| R3 | 1K | |
| R4 | 47K | |
| R5 | 10Ω | |
| R6 | 0.47Ω-25W | |
| *Additional Components* | | |
| $n_2$ | 1000 turn ac current probe. Model Number 80i-600. Manufactured by John Fluke Mfg. Co. Inc. | |
| $V_s$ | 12 Volt, 8 Amp dc Power Supply. Model Number ETU-12V80. Manufactured by Panasonic, Inc. | |

Figure 7:
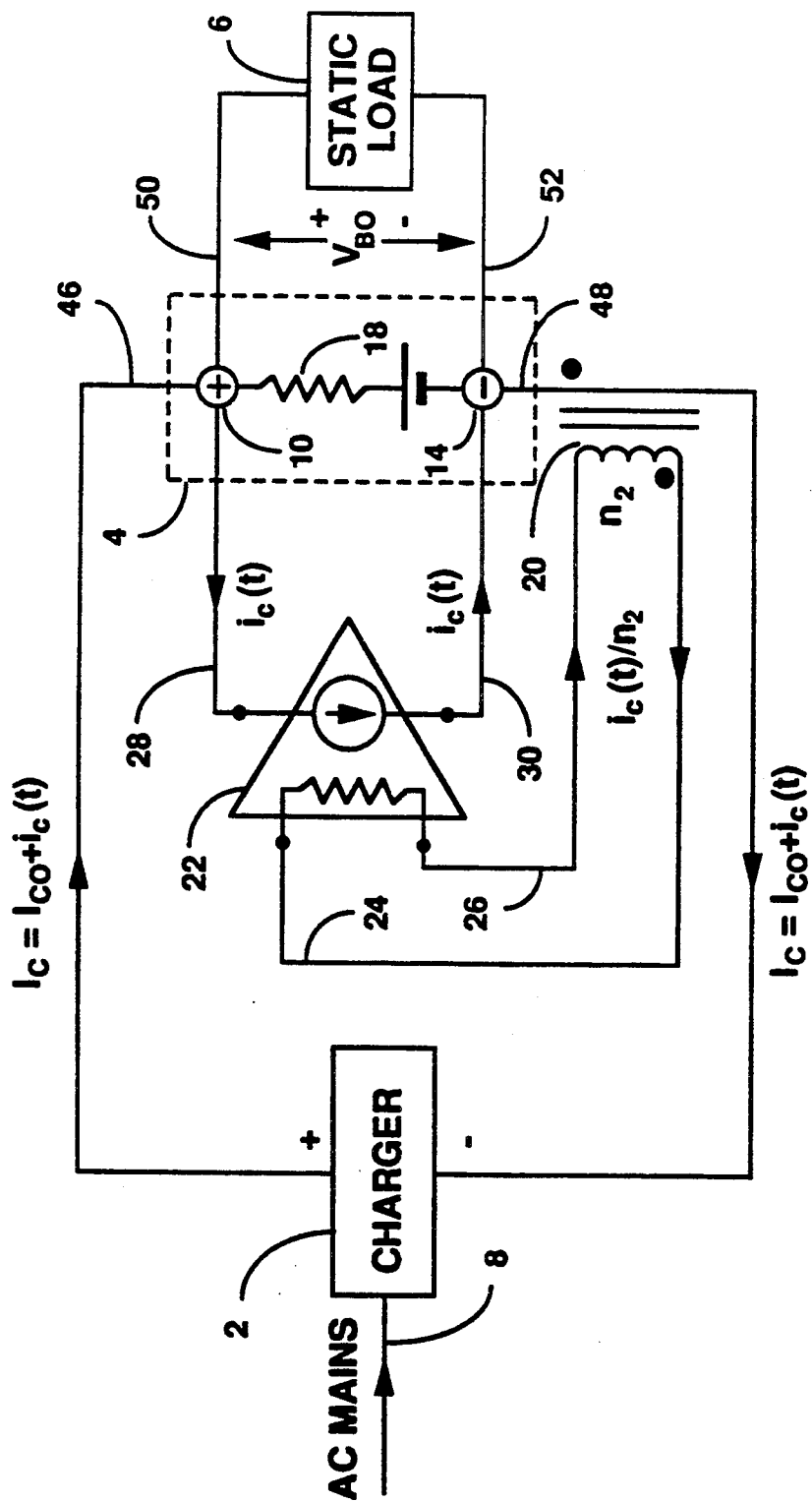
FIG. 7 discloses a simplified block diagram depicting a method for preventing charger-generated "ripple" from being conducted to one or more static battery loads by an application of apparatus of the type disclosed in FIG. 6.

FIG. 7 is a simplified block diagram disclosing a method for preventing charger-generated "ripple" from being conducted to one or more static battery loads by an application of apparatus of the type disclosed in FIG. 6. This application solves a problem that frequently arises when voltage-sensitive apparatus is powered by a cell or battery that is simultaneously being charged.

One sees in FIG. 7 that charger 2 is connected to positive terminal 10 and negative terminal 14 of cell/battery 4 by means of positive conductor 46 and negative conductor 48. Charger output current $I_C$ comprises an average or dc component $I_{CO}$ along with a time-varying ripple current $i_c(t)$ having zero time-average value. Magnetically-coupled ac current probe 20 senses ripple current $i_c(t)$ as it passes through conductor 48 and induces input current signal $i_c(t)/n_2$ into input signal conductors 24 and 26. Current amplifier 22 having current gain $n_2$ amplifies input current signal $i_c(t)/n_2$. The resulting output current signal $i_c(t)$ is conducted to terminals 10 and 14 by output signal conductors 28 and 30, respectively. These conductors are arranged so that their respective signal currents enter and leave terminals 10 and 14 in phase opposition to the original ripple current $i_c(t)$ conducted to those terminals by conductors 46 and 48. Ripple current $i_c(t)$ is thereby prevented from passing through cell/battery 4 and hence through internal impedance element 18.

Since no ripple current passes through internal impedance element 18, no ripple voltage develops across it. Accordingly, the output voltage of cell/battery 4, as measured between its positive terminal 10 and its negative terminal 14, is the pure dc (constant) value $V_{BO}$. Static load 6, which is connected to terminals 10 and 14 by conductors 50 and 52, will therefore be supplied a pure dc voltage with no ripple component. Although only one static load is pictured in FIG. 7, it is clear that any number of static loads may be connected in parallel to terminals 10 and 14. They will all be supplied a pure dc voltage $V_{BO}$ having no ripple component.

Another application of the present invention is the reduction of "crosstalk" between dynamic loads being supplied by a single dc power source which contains an impedance element. One common form of "crosstalk" is that due to current fluctuations from a dynamic load which produce voltage fluctuations across a common power supply impedance and thereby affect the voltage of all other loads being supplied by the same dc power source. Two methods are proposed herein for solving this problem.

Figure 8:
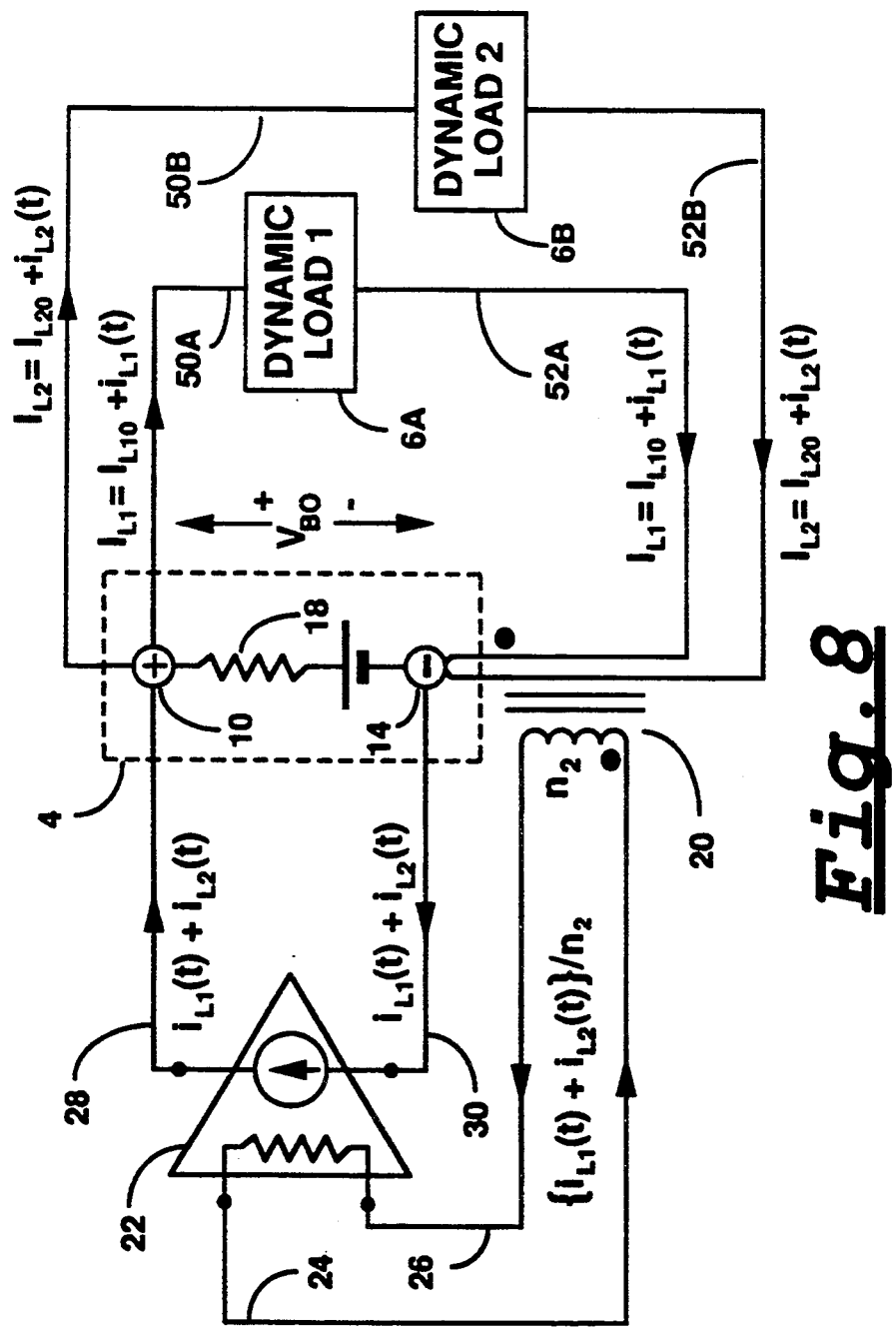
FIG. 8 discloses a simplified block diagram depicting one method for utilizing the apparatus disclosed in FIG. 6 to reduce "crosstalk" between two or more dynamic loads that are powered by the same dc power source.

FIG. 8 is a simplified block diagram disclosing one method for utilizing the apparatus disclosed in FIG. 6 to eliminate "crosstalk" between two or more dynamic loads powered by the same dc power source. Although the common power source is depicted as a cell/battery 4 in FIG. 8, the disclosed method is applicable to any type of dc power source such as, e.g., a rectifier-type dc power supply deriving power from ac mains.

FIG. 8 discloses Dynamic Load 1, 6A, and Dynamic Load 2, 6B, connected in parallel to terminals 10 and 14 of cell/battery 4 by means of positive conductors 50A and 50B, and negative conductors 52A and 52B, respectively. Each dynamic load has a time-varying load-current component, $i_{L1}(t)$ and $i_{L2}(t)$, respectively. The two negative conductors, 52A and 52B are routed together and passed through the magnetic sensing loop of ac current probe 20. Alternatively, the positive conductors 50A and 50B could be used for this purpose. Magnetic ac current probe 20 thus senses the sum of the two time-varying current components $\{i_{L1}(t)+i_{L2}(t)\}$. The resulting induced current $\{I_{L1}(t)+i_{L2}(t)\}/n_2$ is conducted to the input of current amplifier 22 by input current signal conductors 24 and 26. Again, the current gain of current amplifier 22 is chosen equal to $n_2$. Thus, the output current signal flowing in conductors 28 and 30 will be $\{i_{L1}(t)+i_{L2}(t)\}$. This output current signal is conducted to terminals 10 and 14 in phase opposition to the fluctuating load current components entering and leaving terminals 10 and 14 via load conductors 50A, 50B, 52A, and 52B, respectively. Accordingly, all time-varying load current components are prevented from passing through cell/battery 4 and hence through internal impedance element 18.

Since no time-varying load current passes through internal impedance element 18, no time-varying voltage develops across it. Accordingly, the output voltage of cell/battery 4, as measured between its positive terminal 10 and its negative terminal 14, is the pure dc (constant) value $V_{BO}$. Dynamic loads 6A and 6B, which are connected to terminals 10 and 14, are therefore supplied a pure dc voltage with no time-varying component—thus avoiding "crosstalk" between the two loads. Although only two dynamic loads are pictured in FIG. 8, it is clear that any number of dynamic loads may be interconnected in parallel to terminals 10 and 14 with similar results. As long as an appropriate current conductor of each load is routed through the sensing loop of ac current probe 20, all interconnected loads will be supplied a pure dc voltage $V_{BO}$ having no "crosstalk" component.

Figure 9:
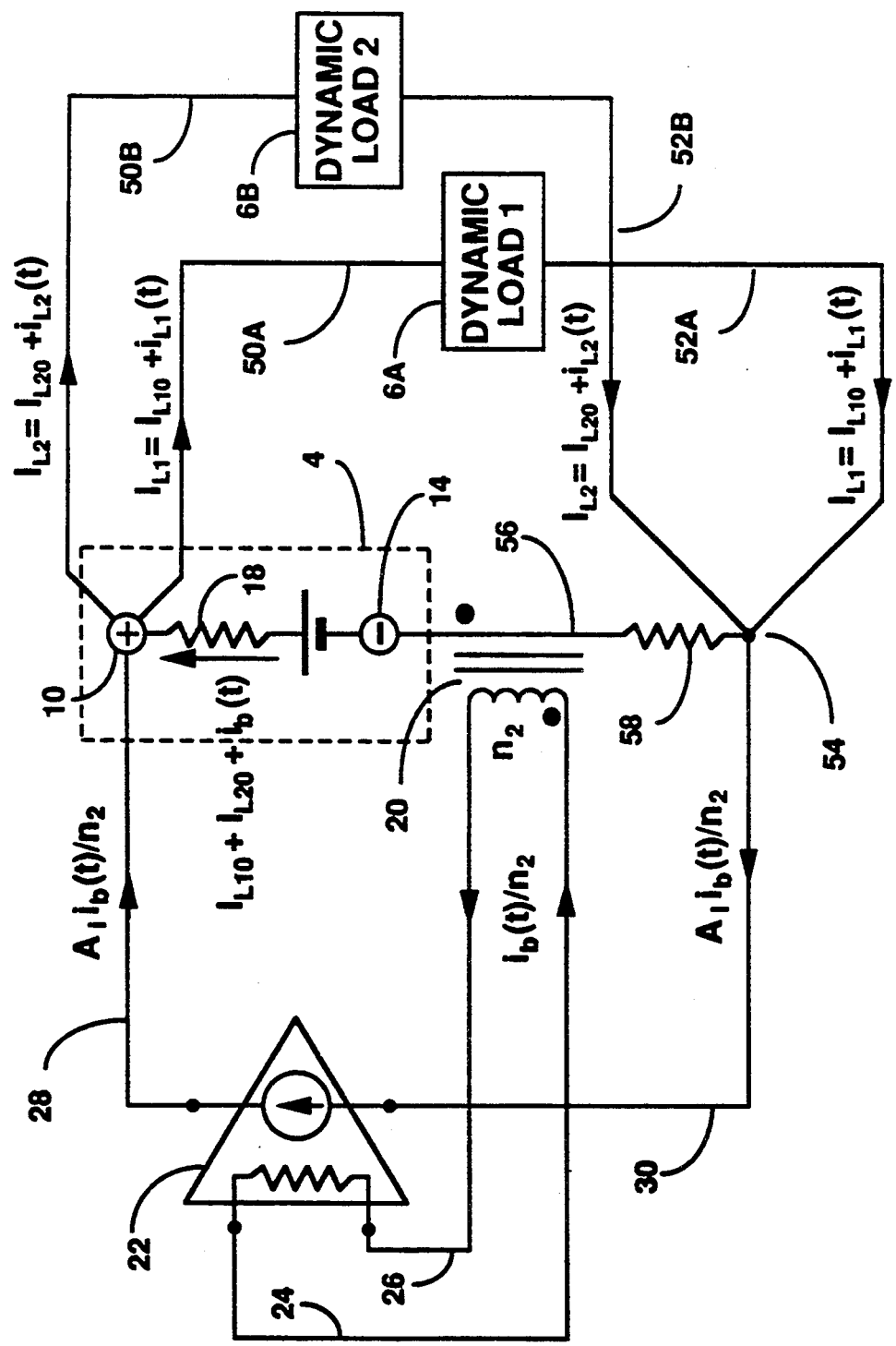
FIG. 9 discloses a simplified block diagram depicting an alternative feedback method for utilizing the apparatus disclosed in FIG. 6 to reduce "crosstalk" between two or more dynamic loads that are powered by the same dc power source.

FIG. 9 discloses an alternative method for solving the problem of "crosstalk" between two or more dynamic loads that are powered by the same power source. Again, although the common power source depicted in FIG. 9 is a cell/battery 4, the disclosed method is quite general and can be applied to any type of dc power supply. The primary advantage of this alternative method is that it only requires sensing current fluctuations in one conductor rather than in multiple conductors, as is the case with the method disclosed in FIG. 8. A disadvantage, however, is that it can effectively reduce "crosstalk" to an acceptable level, but it cannot totally eliminate it—as can the method disclosed in FIG. 8.

Consider FIG. 9. Positive conductor 50A from Dynamic Load 1, 6A, and positive conductor 50B from Dynamic Load 2, 6B, each contact the positive terminal 10 of cell/battery 4 just as they do in the circuit arrangement disclosed in FIG. 8. However, the two negative conductors, 52A and 52B, from the two dynamic loads, 6A and 6B, respectively, join with negative battery lead 56 at negative node 54. The single conductor 56 connects negative node 54 to negative cell/battery terminal 14. The self-impedance of negative battery lead 56 is represented by element 58 in FIG. 9.

Magnetically-coupled ac current probe 20 senses the time-varying current components flowing in the single negative battery lead 56. The resultant induced current signal is conducted to the input of current amplifier 22 by input conductors 24 and 26. Output signal conductors 28 and 30 then conduct the output current signal of current amplifier 22 to positive terminal 10 and negative node 54, respectively.

The topography disclosed in FIG. 9 places ac current probe 22 within the output circuit loop of current amplifier 22. As a result, a "feedback mode" of operation now prevails that is quite different from the mode of operation disclosed above with reference to FIGS. 3 through 8. This "feedback mode" of operation will now be analyzed.

Let $i_b(t)$ be the total time-varying component of current flowing within the battery from negative terminal 14 to positive terminal 10. In addition, let the current gain of current amplifier 22 be represented by $A_i$. Ac current probe 22 senses time-varying current $i_b(t)$ flowing in conductor 56 thus inducing an input current $i_b(t)/n_2$ into input conductors 24 and 26. This induced current is applied to the input of current amplifier 22 thus producing the output current $A_i i_b(t)/n_2$ flowing in the output circuit of amplifier 22. Conductors 28 and 30 conduct output current $A_i i_b(t)/n_2$ into positive terminal 10, and away from negative node 54, respectively.

According to Kirchhoff's current law, the net current entering a node equals the net current leaving that node. Applying this well-known circuit law to node 54 yields the equation $$A_i i_b(t)/n_2 + i_b(t) = i_{L1}(t) + i_{L2}(t) \quad \text{Eq. 8}$$

Solving equation (8) for $i_b(t)$ leads to $$i_b(t) = \frac{\{i_{L1}(t) + i_{L2}(t)\}}{\left(\frac{A_i}{n_2} + 1\right)} \quad \text{Eq. 9}$$

One sees from equation (9) that $i_b(t)$ can be made vanishingly small by choosing $A_i/n_2$ to be sufficiently large. With $i_b(t)$ vanishingly small, the time-varying component of voltage developed across the common impedance elements, 18 and 58, will likewise be vanishingly small.

The circuit disclosed in FIG. 9 provides a practical alternative solution to the problem of "crosstalk" resulting from coupling between dynamic loads through common impedance elements in their common power supply circuit. This alternative solution is quite different from the solution disclosed with reference to FIG. 8. With the circuit arrangement of FIG. 8, complete cancellation of "crosstalk" is possible and occurs under the condition $A_i/n_2 = 1$. However, this solution requires multiple conductors in the sensing loop of ac current probe 22. The circuit of FIG. 9 uses only one conductor in the sensing loop but would require infinite gain of current amplifier 22 to achieve complete "crosstalk" cancellation.

Figure 10:
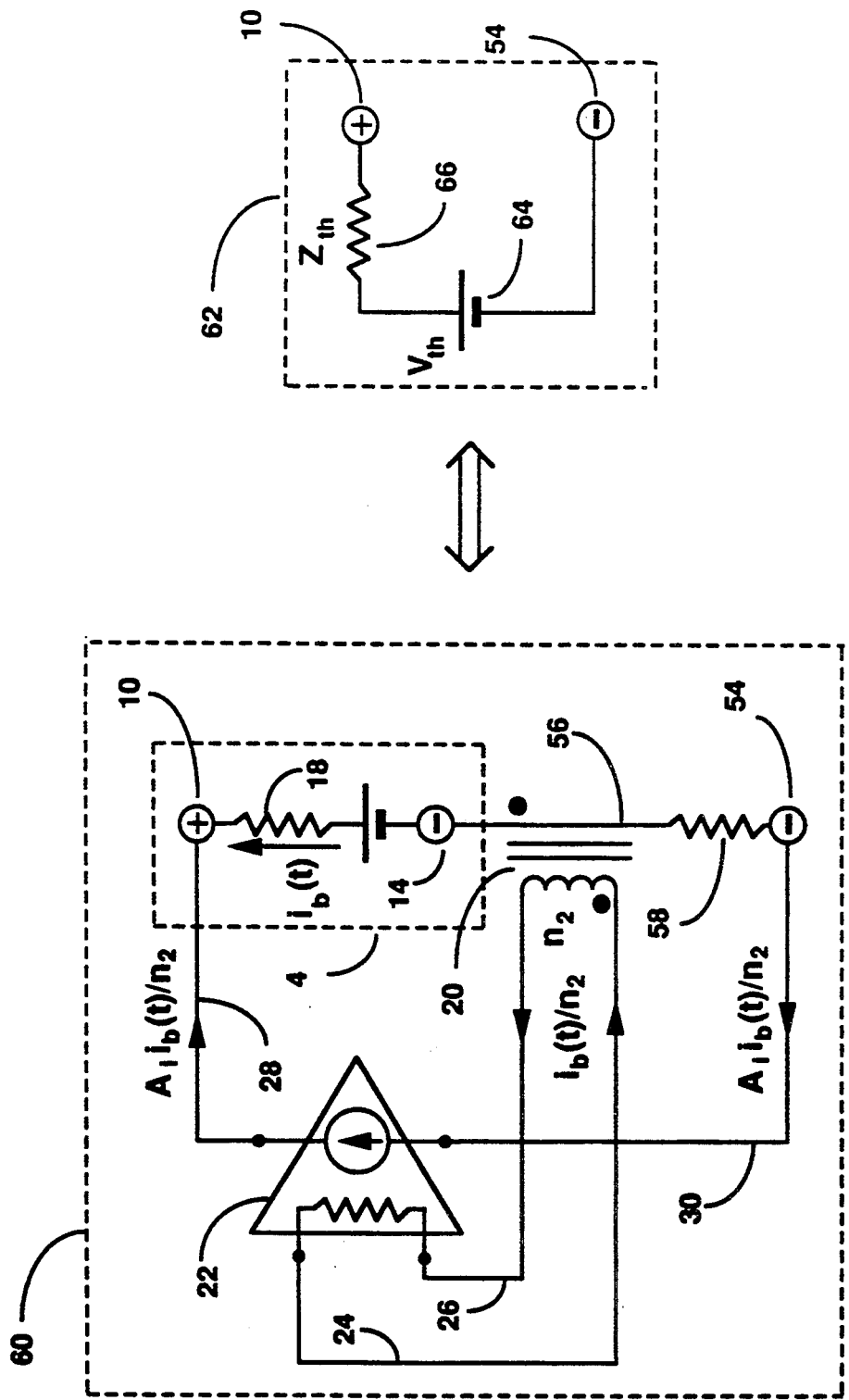
FIG. 10 depicts a part of the circuit disclosed in FIG. 9 as being represent by its Thevenin's equivalent circuit.

The feedback method for reducing $i_b(t)$ disclosed in FIG. 9 actually represents a very general technique that has broad implications beyond simply the reduction of "crosstalk". This generality is illustrated in FIG. 10. FIG. 10 discloses the feedback circuitry of FIG. 9 grouped together as block 60. Block 60 may be regarded as a two-terminal dc power source having a positive output terminal 10 and a negative output terminal 54. As will be appreciated by those skilled in the art, such a two-terminal power source can be simply represented by its Thevenin's equivalent circuit 62 insofar as its external behavior is concerned. Thevenin's circuit 62 comprises an ideal voltage source 64 in series with an equivalent Thevenin's impedance 66.

One can calculate the equivalent Thevenin's impedance 66 of block 60 by placing an incremental time-varying current source between terminals 10 and 54 and solving for the resulting incremental voltage produced by it. The ratio of incremental voltage to incremental current is then $Z_{th}$. Performing this simple calculation leads to $$Z_{th} = \frac{Z_{int}}{\left(\frac{A_i}{n_2} + 1\right)} \quad \text{Eq. 10}$$

where $Z_{int}$ is the sum of the two internal impedance elements 18 and 58. One sees that $Z_{th}$ approaches zero as $A_i/n_2$ tends to infinity.

One concludes that the dc power source identified as block 60 can, by choosing $A_i/n_2 \gg 1$, be made to approach an "ideal" Thevenin's voltage source insofar as dynamic (i.e., time-varying) changes in load current are concerned. This conclusion suggests many additional uses of the feedback embodiment of the disclosed invention beyond that of simply reducing "crosstalk" as disclosed in FIG. 9.

Although specific modes for carrying out the invention hereof have been described, it should be understood that modifications and variations can be made without departing from what is regarded to be the scope and subject matter of the invention. For example, instead of using magnetically-coupled ac current probe 20 to sense $i_b(t)$, one could determine $i_b(t)$ by sensing the ac voltage drop across one of the cell/battery's external leads, or any other resistive element in the external circuit carrying $i_b(t)$. Further, power MOSFETs could replace the Darlington-connected bipolar transistors in the output stage of current amplifier 22. Also, this output stage could operate in the "class-A" mode rather than the "class-B" mode, thus eliminating power supply $V_S$ but passing dc current through cell/battery 4. Finally, cell/battery 4 is only used for illustrative purposes in this specification. The methods and apparatus disclosed herein are actually applicable to any dc power source not just to electrochemical cells and batteries. All such modifications and variations are believed to fall within the scope of the invention disclosed herein and are intended to be covered by the appended claims.

Although the present invention has been described with reference to preferred embodiments, workers skilled in the art will recognize that changes may be made in form and detail without departing from the spirit and scope of the invention.

What is claimed is:

1. An electronic device for reducing a time-varying current component passing through a dc power source, said dc power source a part of a circuit carrying said time-varying current component comprising:
    means for sensing said time-varying current component flowing in said circuit and for producing a signal proportional thereto;
    means for amplifying said signal and for producing an output signal proportional thereto between a pair of amplifier output terminals;
    means for resistively coupling said amplifier output terminals to said dc power source and for passing a time-varying amplifier output current through said dc power source in phase opposition to said time-varying current component passing through said dc power source; and,
    means for sensing the voltage across said dc power source and for regulating the voltage between said pair of amplifier output terminals therewith to prevent excessive dc current from flowing through said means for resistively coupling said amplifier output terminals to said dc power source.

2. An electronic device according to claim 1 wherein said means for sensing said time-varying current component comprises a magnetically coupled current probe coupled to said circuit.

3. An electronic device for reducing a time-varying voltage between a pair of nodes located in a conducting path carrying a time-varying current comprising:
    means for sensing said time-varying current flowing in said conducting path and for producing a signal proportional thereto;
    means for amplifying said signal and for producing an output signal proportional thereto between a pair of amplifier output terminals;
    means for resistively coupling said amplifier output terminals to said pair of nodes and for conducting a time-varying amplifier output current into one of said pair of nodes and out of the other of said pair of nodes in phase opposition to said time-varying current passing between said pair of nodes in said conducting path; and,
    means for sensing the voltage between said pair of nodes and for regulating the voltage between said pair of amplifier output terminals therewith to prevent excessive dc current from flowing through said means for resistively coupling said amplifier output terminals to said pair of nodes.

4. An electronic device according to claim 3 wherein said means for sensing said time-varying current comprises a magnetically coupled current probe coupled to said conducting path.

5. An electronic device for passing a time-varying current through first and second terminals having a dc potential difference between them while preventing the flow of direct current through said electronic device comprising:
    operational amplifier means having an inverting input terminal, a non-inverting input terminal, an output terminal, and a pair of power terminals;
    power amplifier means having an input terminal, an output terminal, and a pair of power terminals, said input terminal of said power amplifier means coupled to said output terminal of said operational amplifier means;
    power supply means having power supply terminals coupled to said pair of power terminals of said operational amplifier means and to said pair of power terminals of said power amplifier means, one of said power supply terminals also coupled to said second terminal;
    first resistive means coupling said output terminal of said power amplifier means to said first terminal;
    second resistive means coupling said output terminal of said power amplifier means to said inverting input terminal of said operational amplifier means;
    third resistive means coupling said non-inverting input terminal of said operational amplifier means to said first terminal; and,
    time-varying signal source means coupled to said inverting input terminal and to said non-inverting input terminal of said operational amplifier means.

6. An electronic device according to claim 5 wherein said time-varying signal source means comprises a magnetically coupled current probe sensing a time-varying current flowing into one of said first and second terminals.

7. An electronic device for reducing the dynamic Thevenin's impedance of a dc voltage source having a pair of voltage source output terminals comprising:
    means for sensing changes in current flowing within said dc voltage source between said voltage source output terminals and for producing a signal proportional to a time-varying component of said current;
    means for amplifying said signal and for producing an output signal proportional thereto between a pair of amplifier output terminals;
    means for resistively coupling said amplifier output terminals to said voltage source output terminals and for passing a time-varying amplifier output current through said dc voltage source in opposition to said changes in current flowing through said dc voltage source; and,
    means for sensing the voltage across said pair of voltage source output terminals and for regulating the voltage between said pair of amplifier output terminal therewith to prevent excessive dc current from flowing through said means for resistively coupling said amplifier output terminals to said voltage source output terminals.

8. An electronic device according to claim 7 wherein said means for sensing changes in current flowing through said dc voltage source comprises a magnetically coupled current probe.

* * * * *